United States Patent
Ko et al.

(10) Patent No.: US 8,013,963 B2
(45) Date of Patent: Sep. 6, 2011

(54) COLOR FILTER, METHOD OF FABRICATING THE SAME AND LIQUID CRYSTAL DISPLAY PANEL INCLUDING THE SAME

(75) Inventors: Pei-Wen Ko, Taipei (TW); Ta-Shuang Kuan, Hsinchu County (TW); Chin-Hsia Chen, Hsinchu County (TW)

(73) Assignee: Himax Display, Inc., Tainan (TW)

( * ) Notice: Subject to any disclaimer, the term of this patent is extended or adjusted under 35 U.S.C. 154(b) by 279 days.

(21) Appl. No.: 12/101,735

(22) Filed: Apr. 11, 2008

(65) Prior Publication Data

US 2009/0257006 A1    Oct. 15, 2009

(51) Int. Cl.
*G02F 1/1335* (2006.01)
*G02F 1/1333* (2006.01)

(52) U.S. Cl. ........... 349/115; 349/106; 349/110; 349/97

(58) Field of Classification Search ................ 349/106, 349/97, 115
See application file for complete search history.

(56) References Cited

U.S. PATENT DOCUMENTS

| | | | |
|---|---|---|---|
| 5,764,389 A * | 6/1998 | Grinberg et al. | 359/20 |
| 6,778,238 B2 * | 8/2004 | Moon et al. | 349/106 |
| 6,795,148 B2 * | 9/2004 | Ozawa et al. | 349/115 |
| 6,909,485 B2 * | 6/2005 | Yoon et al. | 349/123 |
| 7,072,013 B2 * | 7/2006 | Yoon | 349/115 |
| 7,098,974 B2 * | 8/2006 | Ko | 349/108 |
| 7,121,669 B2 | 10/2006 | Iisaka | |
| 7,268,852 B2 | 9/2007 | Kuan et al. | |
| 7,567,319 B2 * | 7/2009 | Liu | 349/113 |
| 2004/0239838 A1 * | 12/2004 | Lai | 349/106 |

FOREIGN PATENT DOCUMENTS

| | | |
|---|---|---|
| CN | 1414417 | 4/2003 |
| TW | 1222546 | 10/2004 |

OTHER PUBLICATIONS

Chinese First Examination Report of China Application No. 200810095283.7, dated Sep. 1, 2010.

* cited by examiner

*Primary Examiner* — Wen-Ying P Chen
(74) *Attorney, Agent, or Firm* — J.C. Patents

(57) ABSTRACT

A color filter is described, including a first color filter layer, a first light absorbing layer, a second color filter pattern and a second light absorbing pattern. The first color filter layer is disposed over a substrate. The first light absorbing layer is disposed between the substrate and the first color filter layer. The second color filter pattern covers a portion of the first color filter layer. The second light absorbing pattern is disposed between the second color filter pattern and the first color filter layer.

20 Claims, 6 Drawing Sheets

COLOR FILTER, METHOD OF FABRICATING THE SAME AND LIQUID CRYSTAL DISPLAY PANEL INCLUDING THE SAME

BACKGROUND OF THE INVENTION

1. Field of the Invention

The present invention relates to a color filter, a method of fabricating the same and a liquid crystal display (LCD) panel including the same.

2. Description of Related Art

Liquid crystal displays (LCD) become the mainstream in recent years due to the slim shape, light weight, low operation voltage, low power consumption and radiation-free operation. However, there are still a number of technical limitations for LCDs. Therefore, most of the LCD products are small-dimension display devices.

For large-dimension display devices, those using the projection technology, such as reflective projection display devices and rear projection display devices, are in the development. The reflective projection display devices include liquid crystal projectors (LCP), digital light processing (DLP) projectors and liquid crystal on silicon (LCOS) projection display devices. The LCOS projection technology can also be applied to the rear projection display devices. Although the current market focuses on the liquid crystal projectors and digital light processing projectors, many manufacturers have developed the LCOS projection technology due to the low cost, high aperture ratio (up to 90%) and high resolution (e.g., pixel pitch=12 μm or less).

For a display device, a color filter is required to filter the lights emitted from a light source. A typical color filter is usually formed by interlacing and stacking several color filter layers with different refraction indices so that certain wavelengths are filtered. One of known methods for fabricating a color filter is by performing a lift-off process. First, a photoresist layer shaped as inverted trapezoids between openings in a vertical cross section is formed over a substrate. Thereafter, color filter layers with different refraction indices are sequentially formed on the substrate covering the photoresist layer and filling the openings therein. Since the sidewalls of the inverted trapezoids are difficult to be covered by the color filter layers when the angle thereof gets larger, the color filter layers on the photoresist layer can be removed by using a lift-off process so that the color filter layers on the substrate remain. A negative photoresist is frequently used for forming the inverted trapezoid photoresist layer, and the sidewall angle is affected by the thickness of the photoresist layer and the reaction of the photoresist agents. In the fabricating process, the sidewall angle is controlled by the exposure dose and post-exposure baking temperature; thus, the sidewall angle is confined and large-angled inverted trapezoids are impossible.

Another method for fabricating a color filter is by performing a lift-off process and an etching process at the same time. A first color filter layer is formed on a substrate. An etching process is then performed, using a patterned photoresist layer as a mask, to the first color filter layer so as to form a first color filter pattern. Thereafter, a second color filter layer is formed over the substrate covering the patterned photoresist layer and a portion of the substrate that is exposed by the first color filter pattern. Afterwards, a lift-off process is performed to simultaneously remove the patterned photoresist layer and the second color filter layer thereon, so that the second color filter layer in the openings of the first color filter pattern remains to form a second color filter pattern. A gap fill layer is then formed.

However, a serious optical problem occurs in the above-mentioned method when color filter layers are formed by depositing and interlacing inorganic films. In detail, because the patterned photoresist layer and the first color filter pattern are very thick, a shadow effect is caused in deposition of the second color filter layer; thus, a gap exists between the second color filter layer and the adjacent first color filter pattern resulting in a lower aperture ratio. Also, the thickness of the second color filter layer in the openings of the first color filter pattern is not uniform due to the shadow effect, and the thickness at the center is larger than that in the periphery. The smaller thickness in the periphery causes certain problems to the optical performance, such as a reduced reflection area, an altered refraction index and a shifted spectrum. Further, the subsequently formed gap fill layer is difficult to fill in due to the non-uniform thickness of the second color filter layer and a rough topography is caused; thus, an alignment problem occurs in the later formed liquid crystal layer between the two substrates. Moreover, since the photoresist layer is removed by the lift-off process, the cleaning degree of the process is difficult to control.

SUMMARY OF THE INVENTION

This invention provides a color filter which substantially has no gap between color filter patterns of different colors and is therefore higher in the aperture ratio and reflection efficiency.

This invention also provides a color filter with improved optical performance.

This invention further provides a color filter including color filter layers with a uniform thickness, which can prevent the alignment problem of liquid crystal molecules caused by the rough topography of the conventional color filter.

This invention further provides a method of fabricating a color filter, which is simple and easy to control so that the misalignments are reduced.

This invention further provides a reflective projection display panel including color filter layers with a uniform thickness, so that the alignment of liquid crystal molecules is less affected.

This invention provides a color filter including a first color filter layer, a first light absorbing layer, a second color filter pattern and a second light absorbing pattern. The first color filter layer is disposed over a substrate. The first light absorbing layer is disposed between the substrate and the first color filter layer. The second color filter pattern covers a portion of the first color filter layer. The second light absorbing pattern is disposed between the second color filter pattern and the first color filter layer.

According to an embodiment, the color filter further includes a planarization layer covering the portion of the first color filter layer not covered by the second color filter pattern.

According to an embodiment, the planarization layer may include a material selected from the group consisting of tetraethyl orthosilicate (TEOS), silicon oxide, undoped silicate glass (USG), borophosphosilicate glass (BPSG), phosphosilicate glass (PSG), low dielectric constant materials and combinations thereof.

According to an embodiment, the color filter further includes a third color filter pattern and a third light absorbing pattern therebelow, which cover a portion of the second color filter pattern, a portion of the planarization layer or both.

According to an embodiment, each of the first light absorbing layer, the second light absorbing pattern and the third light absorbing pattern independently includes, for example, titanium (Ti), titanium nitride (TiN), tantalum (Ta), tantalum nitride (TaN), chromium (Cr), molybdenum (Mo) or molybdenum nitride (MoN).

According to an embodiment, the first color filter layer, the second color filter pattern and the third color filter pattern are inorganic films, for example.

This invention also provides a method of fabricating a color filter. A first light absorbing layer is formed over a substrate. A first color filter layer is formed on the first light absorbing layer. A second light absorbing layer is formed on the first color filter layer. A second color filter layer is formed on the second light absorbing layer. The second color filter layer and the second light absorbing layer are patterned so as to form a second color filter pattern and a second light absorbing pattern.

According to an embodiment, the method further includes forming a first planarization layer covering the portion of the first color filter layer not covered by the second color filter pattern. The method may further includes performing a planarization process to the first planarization layer.

According to an embodiment, the method further includes forming a third light absorbing layer and a third color filter layer on the substrate and then patterning the same to form a third color filter pattern and a third light absorbing pattern, which cover a portion of the second color filter pattern, a portion of the planarization layer or both. The method may further include forming a second planarization layer covering the portion of the first planarization layer and the portion of the second color filter layer that are not covered by the third color filter pattern.

According to an embodiment, each of the first light absorbing layer, the second light absorbing pattern and the third light absorbing pattern independently include, for example, Ti, TiN, Ta, TaN, Cr, Mo or MoN.

According to an embodiment, the first color filter layer, the second color filter pattern and the third color filter pattern are inorganic films, for example.

This invention further provides a reflective liquid crystal display panel including a transparent substrate, a reflection substrate and a liquid crystal layer between them. The transparent substrate has a first electrode layer thereon. The reflection substrate has thereon a device layer and an aforementioned color filter of this invention. The liquid crystal layer is disposed between the first electrode layer and the color filter.

According to an embodiment, the reflection substrate includes a semiconductor substrate or another transparent substrate having a reflection layer, for example.

According to an embodiment, the reflective liquid crystal display panel further includes a polarization film disposed on a surface of the transparent substrate not having the first electrode layer thereon.

According to an embodiment, the reflective liquid crystal display panel farther includes a planarization layer that covers the portion of the first color filter layer not covered by the second color filter pattern. The planarization layer may include a material selected from the group consisting of tetraethyl orthosilicate (TEOS), silicon oxide, undoped silicate glass (USG), borophosphosilicate glass (BPSG), phosphosilicate glass (PSG), low dielectric constant materials and combinations thereof.

According to an embodiment, in the reflective liquid crystal display panel, the color filter further includes a third color filter pattern and a third light absorbing pattern therebelow, which cover a portion of the second color filter pattern, a portion of the planarization layer or both.

According to an embodiment, in the reflective liquid crystal display panel, each of the first light absorbing layer, the second light absorbing pattern and the third light absorbing pattern independently includes, for example, Ti, TiN, Ta, TaN, Cr, Mo or MoN.

The color filter in accordance with this invention can avoid optical loss and increase the reflection area and the aperture ratio of the device.

In this invention, the color filter includes color filter layers with a uniform thickness so that the alignment problem of liquid crystal molecules caused by the rough topography of the conventional color filter is solved.

Moreover, the method of fabricating a color filter of this invention is simple and easy to control.

Further, in the reflective projection display panel of this invention, the color filter includes color filter layers with a uniform thickness so that the alignment of liquid crystal molecules is less affected.

In order to make the aforementioned and other objects, features and advantages of the present invention comprehensible, a preferred embodiment accompanied with figures is described in detail below.

BRIEF DESCRIPTION OF THE DRAWINGS

FIG. 3F-1 schematically illustrates, in a cross-sectional view, a method of fabricating a color filter according to a modified version of the third embodiment of this invention.

DESCRIPTION OF EMBODIMENTS

First Embodiment

Figure 1A:
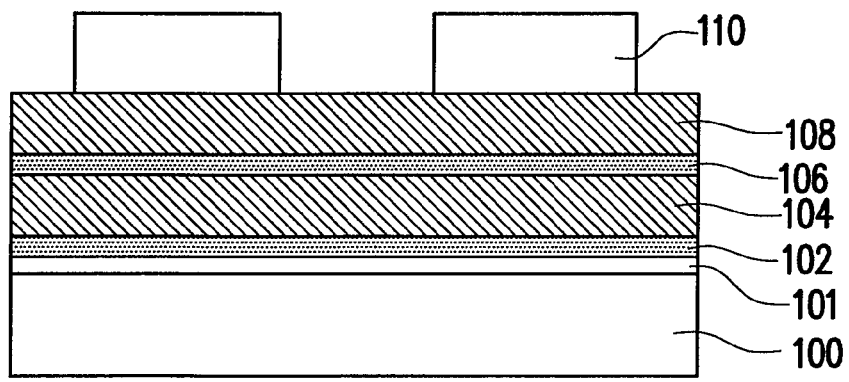
FIGS. 1A-1C schematically illustrate, in a cross-sectional view, a method of fabricating a color filter according to a first embodiment of this invention.
Figure 1B:
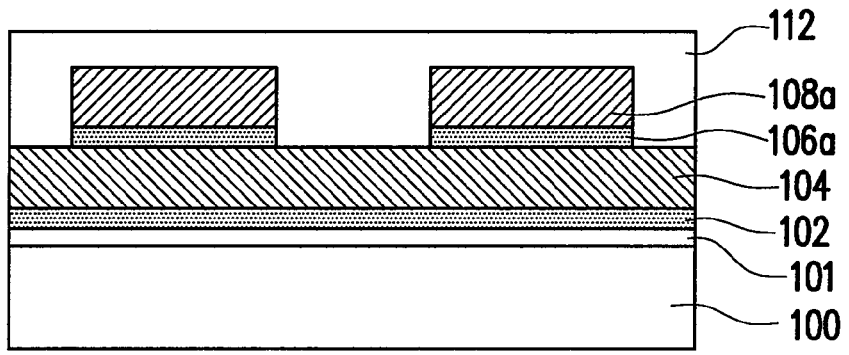
Figure 1C:
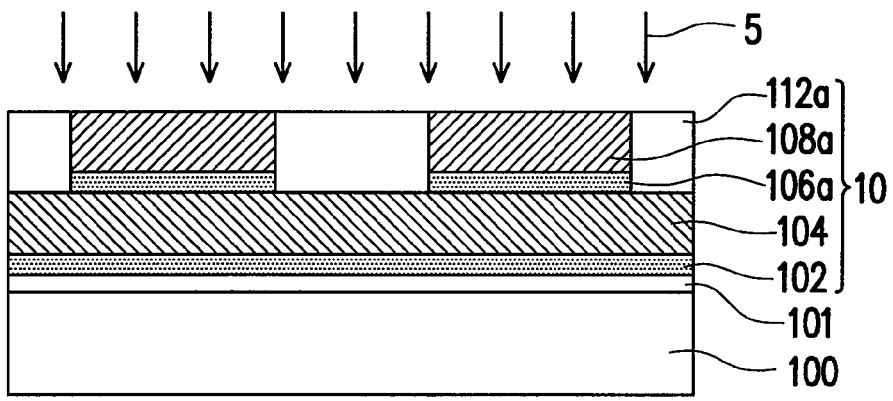

FIGS. 1A-1C schematically illustrate, in a cross-sectional view, a method of fabricating a color filter according to the first embodiment of this invention.

Referring to FIG. 1A, a first light absorbing layer 102 and a first color filter layer 104 are sequentially formed over a substrate 100. Thereafter, a second light absorbing layer 106 and a second color filter layer 108 are sequentially formed on the first color filter layer 104. The substrate 100 is a flexible substrate or a hard substrate. For example, the frequently used hard substrate is a glass substrate, a quartz substrate or a silicon substrate, and the frequently used flexible substrate is a plastic substrate. The substrate 100 may have a device layer 101 thereon, which may be an active device layer or a passive device layer. The active device layer may be formed with thin film transistors (TFTs) and pixel electrodes, or MOS field-effect transistors (MOSFETs) and pixel electrodes. The passive device layer may include electrodes.

Each of the first light absorbing layer 102 and the second light absorbing layer 106 may independently include metal or metal nitride, such as titanium (Ti), titanium nitride (TiN), tantalum (Ta), tantalum nitride (TaN), chromium (Cr), molybdenum (Mo) or molybdenum nitride (MoN). The thickness of each of the first light absorbing layer 102 and the second light absorbing layer 106 ranges from 1500 to 2500 angstroms, for example. The method of forming each of the first light absorbing layer 102 and the second light absorbing layer 106 may be chemical vapor deposition (CVD) or physical vapor deposition (PVD), for example. The first color filter layer 104 and the second color filter layer 108 are inorganic films with different colors such as two colors among red, green and blue colors, each of which may be formed by interlacing high refraction layers with a refraction index higher than 1.9 and low refraction layers with a refraction index below 1.9. The material of the high refraction layers may be selected from $TiO_2$, $Ti_3O_5$, $Ti_2O_3$, $TiO$, $Ta_2O_5$ and ZnS. The material of the low refraction layers may be selected from $SiO_2$, $CaF_2$, $MgF_2$ and $Na_3AlF_6$. Thereafter, a first patterned photoresist layer 110 is formed on the second color filter layer 108.

Referring to FIG. 1B, an etching process is performed, using the first patterned photoresist layer 110 as a mask, to the second color filter layer 108 and the second light absorbing layer 106, so as to form a second color filter pattern 108a and a second light absorbing pattern 106a. After the first patterned photoresist layer 110 is removed, a planarization layer 112 is formed over the substrate 100 covering the second color filter pattern 108a and the portion of the first color filter layer 104 not covered by the second color filter pattern 108a. The planarization layer 112 may include a material selected from the group consisting of tetraethyl orthosilicate (TEOS), silicon oxide, undoped silicate glass (USG), borophosphosilicate glass (BPSG), phosphosilicate glass (PSG), low dielectric constant material and combinations thereof. The low dielectric constant material is a material with dielectric constant smaller than 4. Examples of the low dielectric constant material include fluorosilicon glass (FSG), hydrogen silsesquioxane (HSQ), methyl silesquioxane (MSQ) mixed with hybrido-organosiloxane polymer (HOSP), aromatic hydrocarbon such as SiLK, organosilicate glass such as black diamond (BD), 3MS and 4MS, parylene, fluoropolymer such as PFCB, CYTOP and teflon, and poly-arylethers such as PAE-2 and FLARE. The method of forming the planarization layer 112 includes plasma-enhanced chemical vapor deposition (PSCVD), sub-atmospheric chemical vapor deposition (SACVD), high aspect ratio process (HARP), high temperature thermal oxidation process, low pressure chemical vapor deposition (PLCVD), high density plasma chemical vapor deposition (HDP-CVD) and spin coating, for example.

Referring to FIG. 1C, a planarization process is performed to the planarization layer 112 so as to form a planarization layer 112a. As illustrated, the planarization layer 112a covers the portion of the first color filter layer 104 not covered by the second color filter pattern 108a and the light absorbing pattern 106a. It is noted that this embodiment is intended to illustrate and give no limitation to this invention; therefore, the planarization layer 112a may cover the second color filter pattern 108a as well (not shown). The planarization process is a chemical mechanical polishing (CMP) process or an etching back process, for example. The two kinds of processes can be combined together. For example, a CMP process is performed first and followed by an etching back process so as to complete the fabrication process of the color filter 10.

To sum up, in the first embodiment, the color filter 10 disposed on the substrate 100 includes a first light absorbing layer 102, a first color filter layer 104, a second light absorbing pattern 106a, a second color filter pattern 108a and a planarization layer 112a. The first color filter layer 104 is disposed on the substrate 100. The first light absorbing layer 102 is disposed between the first color filter layer 104 and the substrate 100. The second color filter pattern 108a covers a portion of the first color filter layer 104. The second light absorbing layer 106a is disposed between the second color filter pattern 108a and the first color filter layer 104. The planarization layer 112a covers the portion of the first color filter layer 104 not covered by the second color filter pattern 108a, and may further cover the second color filter pattern 108a.

When the color filter 10 is irradiated by light beams 5, for the light beams 5 entering the second color filter pattern 108a, a portion of wavelength range thereof is reflected by the second color filter pattern 108a and the other portion absorbed by the second light absorbing pattern 106a. In other words, the second light absorbing pattern 106a does not allow the other portion of wavelength range to penetrate and be reflected by the first color filter layer 104 therebelow; thus, no color interference occurs.

Meanwhile, for the light beams 5 through the planarization layer 112a into the first color filter layer 104, a portion of wavelength range thereof is reflected by the first color filter layer 104 and the other portion absorbed by the first light absorbing layer 102. Further, for the light beams reflected by the first color filter layer 104, a portion thereof is through the planarization layer 112a to show the corresponding color, and the other portion is absorbed by the second light absorbing pattern 106a on the first color filter layer 104 so that no color interference occurs. Therefore, two colors are filtered through the color filter 10.

Second Embodiment

FIGS. 2A-2F schematically illustrate, in a cross-sectional view, a method of fabricating a color filter according to the second embodiment of this invention.

Figure 2A:
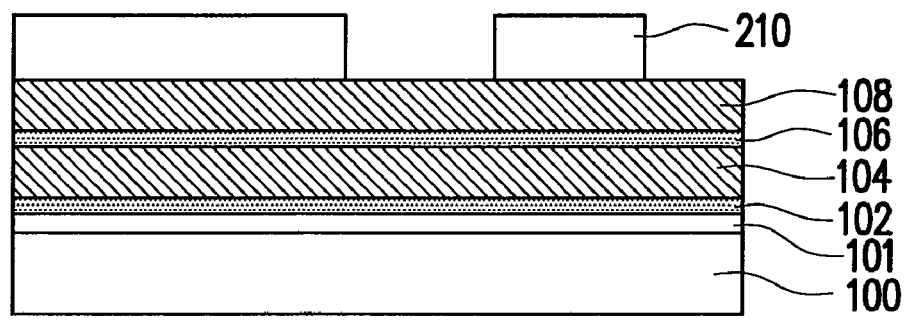
FIGS. 2A-2F schematically illustrate, in a cross-sectional view, a method of fabricating a color filter according to a second embodiment of this invention.

Referring to FIG. 2A, a first light absorbing layer 102 and a first color filter layer 104 are sequentially formed over a substrate 100. Then, a second light absorbing layer 106 and a second color filter layer 108 are sequentially formed on the first color filter layer 104. The material and fabrication method of each of the first light absorbing layer 102, the first color filter layer 104, the second light absorbing layer 106 and the second color filter layer 108 can be the same as those described in the first embodiment. Then, a patterned photoresist layer 210 is formed on the second color filter layer 108.

Figure 2B:
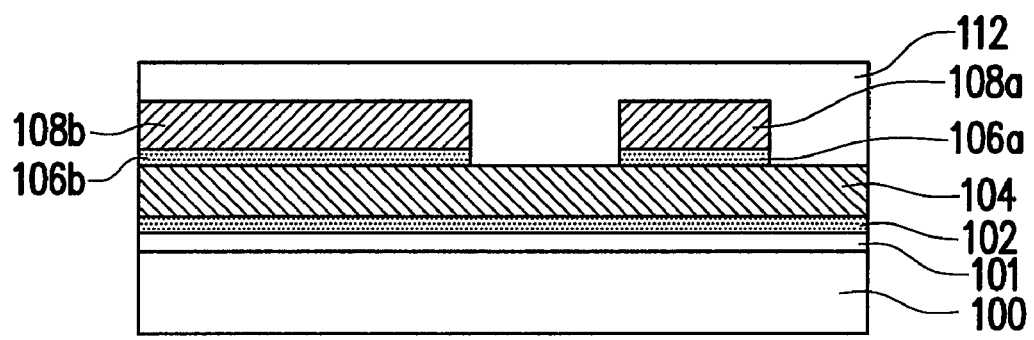

Referring to FIG. 2B, an etching process is performed, using the first patterned photoresist layer 210 as a mask, to the second color filter layer 108 and the second light absorbing layer 106, so as to form second color filter patterns 108a and 108b as well as second light absorbing patterns 106a and 106b. After the patterned photoresist layer 210 is removed, a planarization layer 112 is formed over the substrate 100 covering the second color filter patterns 108a and 108b as well as the portion of the first color filter layer 104 not covered by the second color filter patterns 108a and 108b.

Figure 2C:
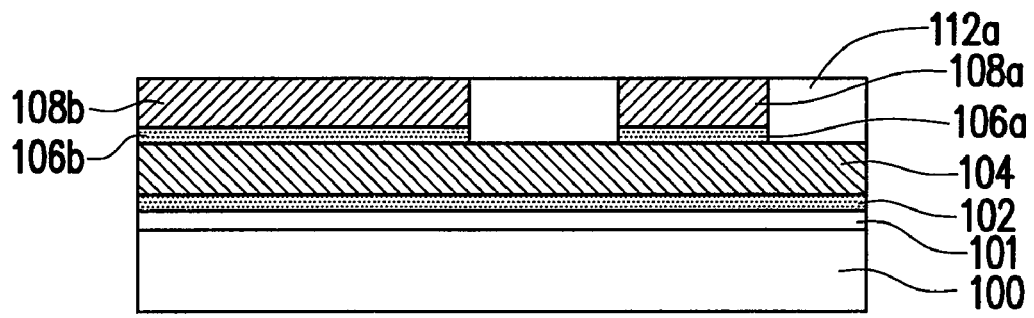

Referring to FIG. 2C, a planarization process is performed to the planarization layer 112 to form a planarization layer 112a. The material and fabrication method of the planarization layer 112 and the planarization process can be the same as those described in the first embodiment.

Figure 2D:
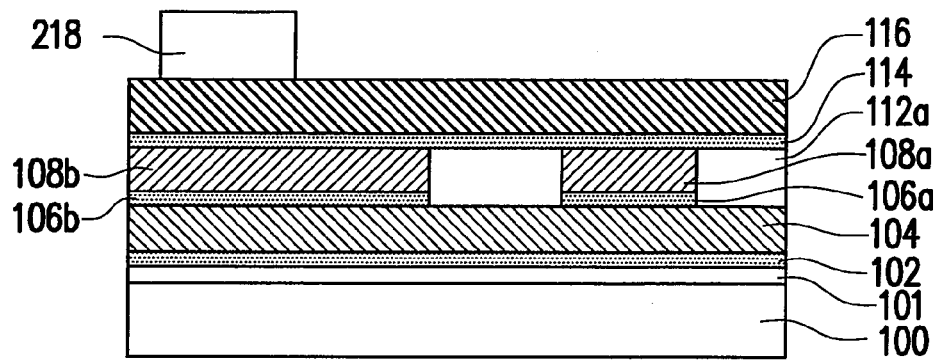

Referring to FIG. 2D, a third light absorbing layer 114 and a third color filter layer 116 are formed over the substrate 100. The third color filter layer 116 and the first color filter layer 104 or the second color filter layer 108 may be inorganic films with two different colors or the same color possibly selected from red, green and blue colors. The third color filter layer 116 may be formed by interlacing high refraction layers with a refraction index higher than 1.9 and low refraction layers with a refraction index below 1.9. The material of the high refraction layers may be selected from $TiO_2$, $Ti_3O_5$, $Ti_2O_3$, TiO, Ta$_2$O$_5$ and ZnS. The material of the low refraction layers may be selected from SiO$_2$, CaF$_2$, MgF$_2$ and Na$_3$AlF$_6$. Thereafter, a patterned photoresist layer 218 is formed on the third color filter layer 116 over the second color filter pattern 108b.

Figure 2E:
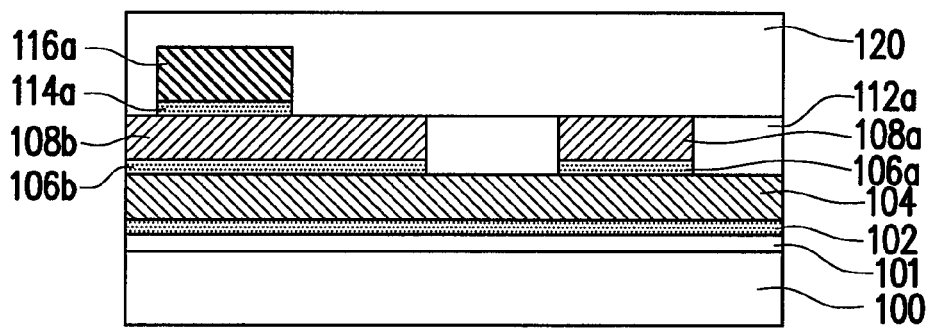

Referring to FIG. 2E, an etching process is performed, using the patterned photoresist layer 218 as a mask, to the third color filter layer 116 and the third light absorbing layer 114, so as to form a third color filter pattern 116a and a third light absorbing pattern 114a on the second color filter pattern 108b. After the patterned photoresist layer 218 is removed, a planarization layer 120 is formed over the substrate 100 covering the third color filter pattern 116a as well as the portion of the second color filter patterns 108a and 108b and the portion of the planarization layer 112a that are not covered by the third color filter pattern 116a.

Figure 2F:
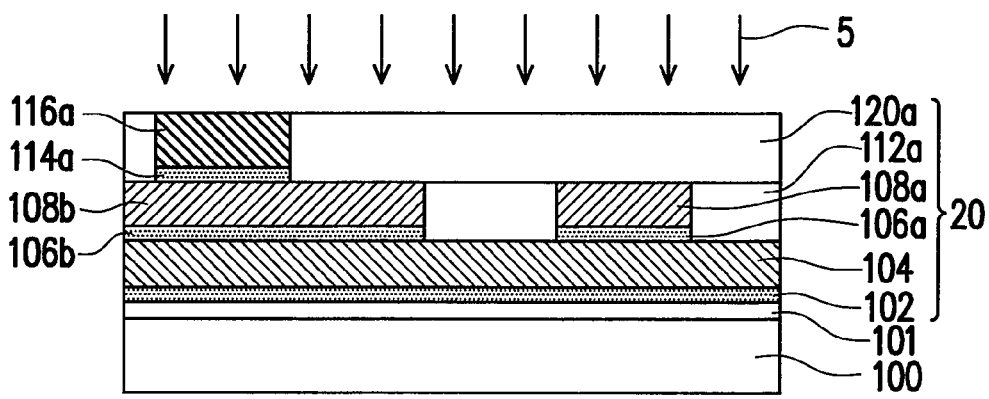

Referring to FIG. 2F, a planarization process is performed to the planarization layer 120 to form a planarization layer 120a. The material and fabrication method of the planarization layer 120 and the planarization process can be the same as those for the precedent planarization layer 112. A color filter 20 is thus finished.

To sum up, in the second embodiment, the color filter 20 over the substrate 100 includes a first light absorbing layer 102, a first color filter layer 104, second light absorbing patterns 106a and 106b, second color filter patterns 108a and 108b, a third light absorbing layer 114a, a third color filter pattern 116a and planarization layers 112a and 120a. The first color filter layer 104 is disposed over the substrate 100. The first light absorbing layer 102 is disposed between the first color filter layer 104 and the substrate 100. The second color filter patterns 108a and 108b respectively cover a portion of the first color filter layer 104. The second light absorbing layer 106a is disposed between the second color filter pattern 108a and the first color filter layer 104. The second light absorbing layer 106b is disposed between the second color filter pattern 108b and the first color filter layer 104. The third color filter pattern 116a covers a portion of the second color filter pattern 108b. The third light absorbing pattern 114a is disposed between the third color filter pattern 116a and the second color filter pattern 108b. The planarization layer 112a covers the portion of the first color filter layer 104 not covered by the second color filter pattern 108a. The planarization layer 120a covers the portion of the second color filter patterns 108a and 108b and the portion of the planarization layer 112a that are not covered by the third color filter pattern 116a, and may further cover the third color filter pattern 116a.

When the color filter 20 is irradiated by light beams 5, for the light beams 5 entering the third color filter pattern 116a, a portion of the wavelength range thereof is reflected by the third color filter pattern 116a to show a certain color and the other portion absorbed by the third light absorbing pattern 114a. That is, the third light absorbing pattern 114a does not allow the other portion of the wavelength range to penetrate and be reflected by the second color filter pattern 108b therebelow, so that no color interference occurs. The behaviors of the light beams 5 through the planarization layer 120a into the second color filter pattern 108b and those through the planarization layers 112a and 120a into the first color filter layer 104 have been described in the first embodiment. Thus, three colors are filtered through the color filter 20.

Third Embodiment

FIGS. 3A-3F schematically illustrate, in a cross-sectional view, a method of fabricating a color filter according to the third embodiment of this invention.

Referring to FIGS. 3A-3F, the fabrication method of this embodiment is similar to that of the second embodiment, and the difference therebetween is described below. In the second embodiment, the etching process is performed, using the patterned photoresist layer 210 as a mask, to the second color filter layer 108 and the second light absorbing layer 106, so as to form the second color filer patterns 108a and 108b as well as the second light absorbing patterns 106a and 106b, and then the third color filter pattern 116a and the third light absorbing pattern 114a are formed on the second color filter pattern 108b. However, in the third embodiment, the etching process is performed, using the patterned photoresist layer 310 as a mask, to the second color filter layer 108 and the second light absorbing layer 106, so as to form the second color filer pattern 108a and the second light absorbing pattern 106a, and then the third color filter pattern 116a and the third light absorbing pattern 114a are formed on the planarization layer 112a. It is noted that the second and third embodiments are intended to illustrate and give no limitation to this invention, and the third color filter pattern 116a and the third light absorbing pattern 114a is not limited to form on the second color filter pattern 108b or the planarization layer 112a but may alternatively be formed covering both of a portion of the second color filter pattern 108b and a portion of the planarization layer 112a. A color filter 30 is thus finished.

To sum up, in the third embodiment, the color filter 30 disposed over the substrate 100 includes a first light absorbing layer 102, a first color filter layer 104, a second light absorbing pattern 106a, a second color filter pattern 108a, a third light absorbing layer 114a, a third color filter pattern 116a and planarization layers 112a and 120a. The first color filter layer 104 is disposed over the substrate 100. The first light absorbing layer 102 is disposed between the first color filter layer 104 and the substrate 100. The second color filter pattern 108a covers a portion of the first color filter layer 104. The second light absorbing layer 106a is disposed between the second color filter pattern 108a and the first color filter layer 104. The third color filter pattern 116a covers a portion of the planarization layer 112a. The third light absorbing pattern 114a is disposed between the third color filter pattern 116a and the planarization layer 112a. The planarization layer 112a covers the portion of the first color filter layer 104 not covered by the second color filter pattern 108a. The planarization layer 120a covers the portion of the second color filter pattern 108a and the portion of the planarization layer 112a that are not covered by the third color filter pattern 116a, and may further cover the third color filter pattern 116a.

When the color filter 30 is irradiated by light beams 5, for the light beams 5 entering the third color filter pattern 116a, a portion of the wavelength range thereof is reflected by the third color filter pattern 116a to show a color and the other portion absorbed by the third light absorbing pattern 114a. That is, the third light absorbing pattern 114a does not allow the other portion of the wavelength range to penetrate the planarization layer 112a and be reflected by the first color filter pattern 104 therebelow, so that no color interference occurs. The behaviors of the light beams 5 through the planarization layer 120a into the second color filter pattern 108b and those through the planarization layers 112a and 120a into the first color filter layer 104 have been clearly described above. Thus, three colors are filtered through the color filter 30.

Figure 3A:
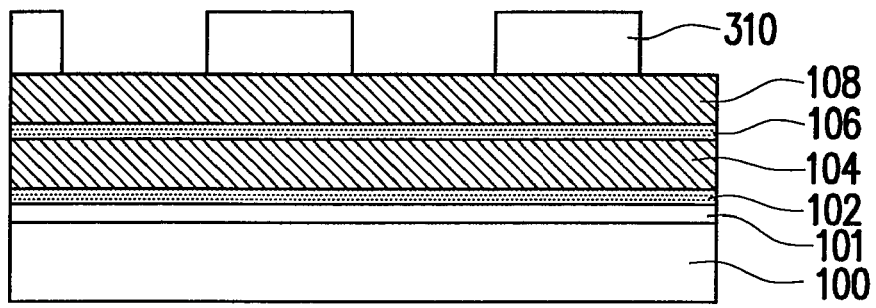
FIGS. 3A-3F schematically illustrate, in a cross-sectional view, a method of fabricating a color filter according to a third embodiment of this invention.
Figure 3B:
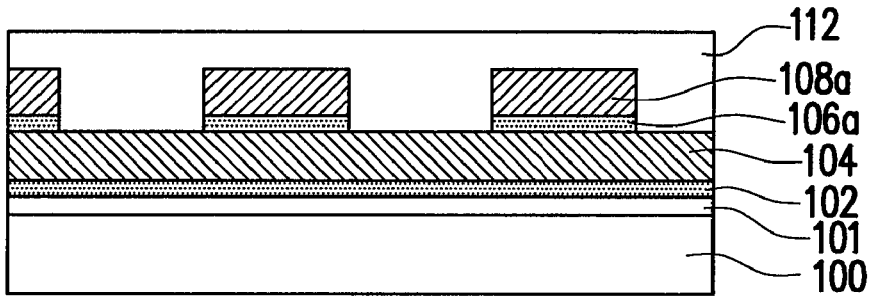
Figure 3C:
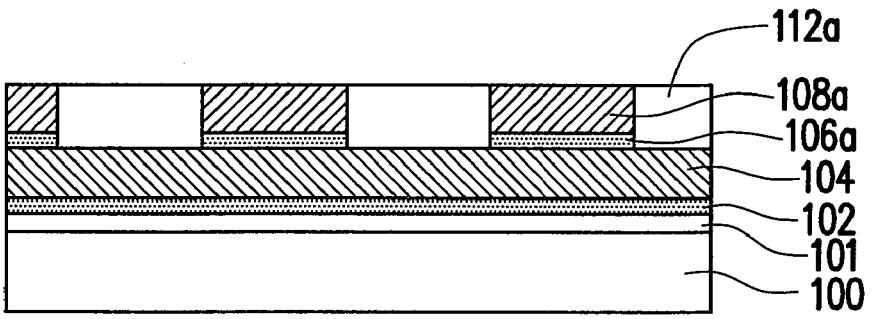
Figure 3D:
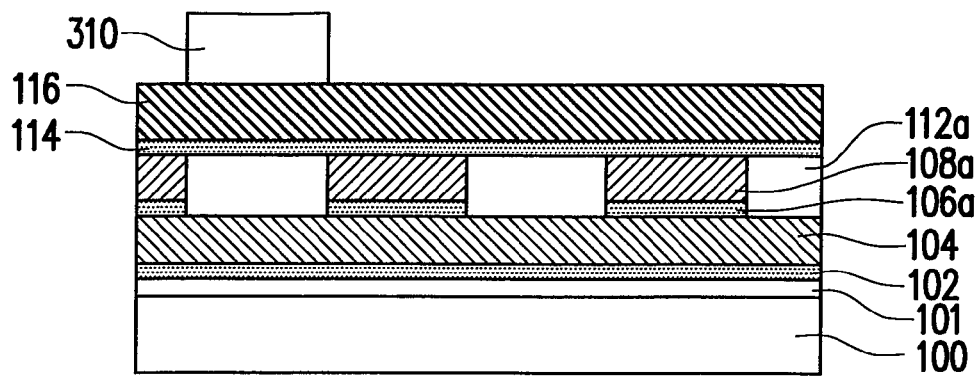
Figure 3E:
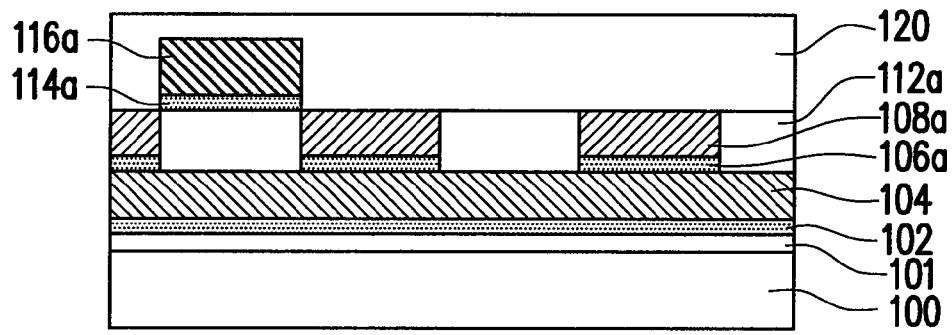
Figure 3F:
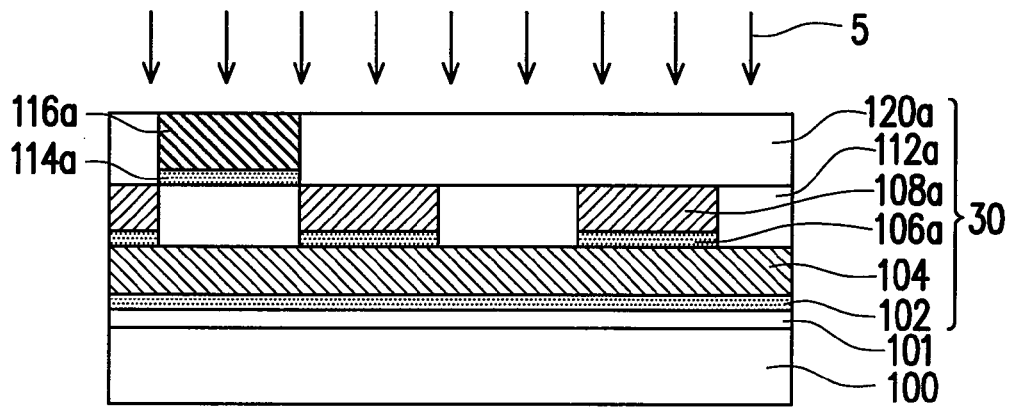
Figures 1, 3F:
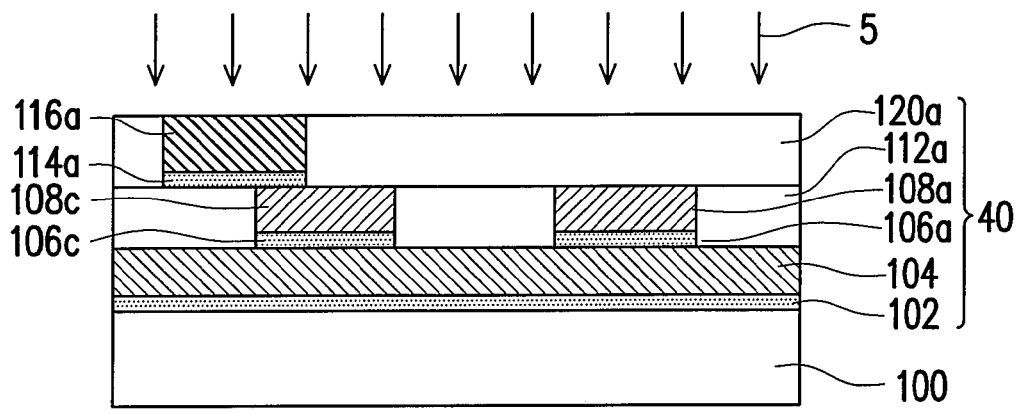

In another embodiment, as shown in FIG. 3F-1, the color filter 40 is similar to the color filter 20 or 30. However, the third color filter pattern 116a therein covers a portion of the planarization layer 112a and a portion of the second color filter pattern 108c. The fabrication method is similar to the above-mentioned embodiments. When the color filter 40 is irradiated by light beams 5, for the light beams 5 entering the third color filter pattern 116a, a portion of the wavelength range thereof is reflected by the third color filter pattern 116a to show a certain color and the other portion absorbed by the third light absorbing pattern 114a. That is, the third light absorbing pattern 114a does not allow the other portion of the wavelength range to penetrate and be reflected by the second color filter pattern 108c therebelow, so that no color interference occurs. The behaviors of the light beams 5 through the planarization layer 120a into the second color filter pattern 108c and those through the planarization layers 112a and 120a into the first color filter layer 104 have been described in the first embodiment. Thus, three colors are filtered through the color filter 40.

Fourth Embodiment

Figure 4:
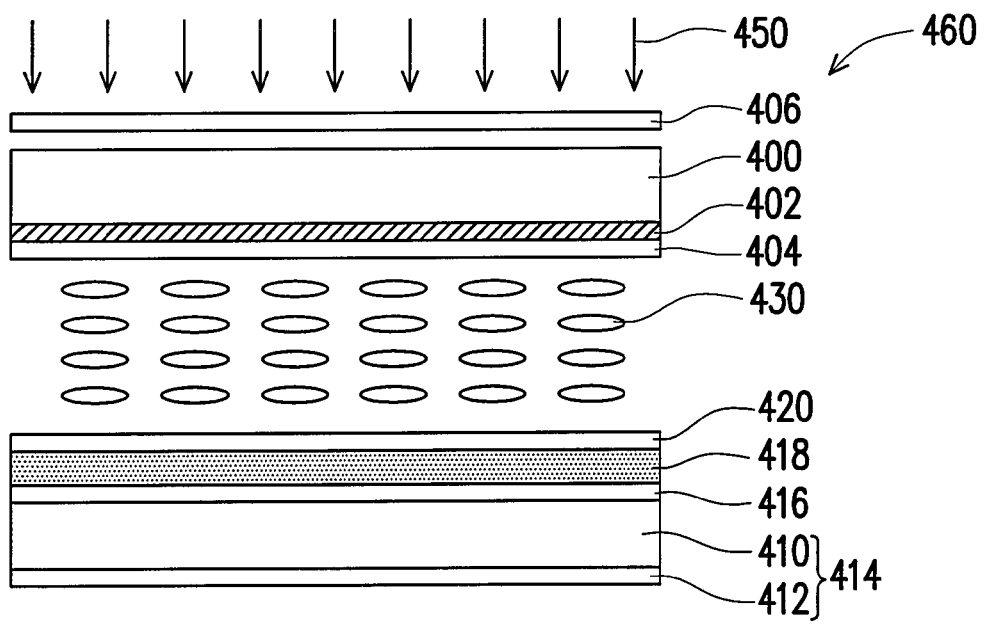
FIG. 4 schematically illustrates a reflection liquid crystal display panel according to a fourth embodiment of this invention.

FIG. 4 schematically illustrates a reflection liquid crystal display panel according to a fourth embodiment of the present invention.

Referring to FIG. 4, the reflective LCD panel 460 includes a transparent substrate 400, a reflection substrate 414 and a liquid crystal layer 430 between them.

The transparent substrate 400 may be a flexible or hard substrate, depending on the application field. For example, a frequently used hard substrate is a glass substrate or a quartz substrate, and a frequently used flexible substrate is a plastic substrate. An electrode layer 402 is disposed on one surface of the transparent substrate 400. The material of the electrode layer 402 may be indium tin oxide (ITO), for example. A polarization film 406 is disposed on the other side of the transparent substrate 400.

The type of the reflection substrate 414 depends on the application field. In one embodiment where the reflective liquid crystal display panel 460 belongs to a LCD device, the reflection substrate 414 may include a transparent substrate 410 and a reflection layer 412 thereon, wherein the reflection layer 412 is disposed away from the liquid crystal layer 430 (FIG. 4) or close to the same (not shown). Similarly, the transparent substrate 410 may be a flexible substrate or a hard substrate, depending on the application field. For example, the frequently used hard substrate is a glass substrate or a quartz substrate, and the frequently used flexible substrate is a plastic substrate. In another embodiment where the reflective liquid crystal display panel belongs to a liquid crystal on silicon (LCOS) projection display device, the reflection substrate 414 is a semiconductor substrate, such as a silicon substrate.

In the reflective liquid crystal display panel 460, the reflection substrate 414 has a device layer 416 thereon. The device layer 416 may be an active device layer or a passive device layer. The active device layer may be formed with thin film transistors (TFTs) and pixel electrodes, or MOS field-effect transistors (MOSFETs) and pixel electrodes. The passive device layer may include electrodes.

The reflection substrate 414 further has a color filter 418 thereover, wherein the color filter 418 is disposed on the device layer 416 (FIG. 4) or between the reflection substrate 414 and the device layer 416 (not shown). The color filter 418 includes the color filter 10, 20, 30 or 40 according to the above embodiments of this invention.

In one embodiment, an alignment layer 404 is disposed between the electrode layer 402 of the transparent substrate 400 and the liquid crystal layer 430, and another alignment layer 420 is disposed between the color filter 418 and the liquid crystal layer 430 (FIG. 4) or between the color filter 418 and the device layer 416 (not shown), for example. The alignment layers 404 and 420 can make liquid crystal molecules in the liquid crystal layer 430 orient at a pre-tilt angle. In another embodiment, the alignment layers 404 and 420 are not required for the liquid crystal display device, and the orientation of liquid crystal molecules in the liquid crystal layer is achieved by doping a light alignment material in the liquid crystal and then irradiating the liquid crystal. For example, the liquid crystal molecules can be changed form original homogeneous orientation to twisted nematic orientation, mixed-mode twisted nematic orientation or other orientation modes with the light radiation.

When light beams 450 through the polarization film 406, the substrate 400 and the liquid crystal layer 430 entering the color filter 418, a certain wavelength range thereof is reflected by the color filter 418, i.e., certain colors are filtered by the color filter 418.

In this invention, the method of fabricating a color filter includes forming a first light absorbing layer, a first color filter layer, a second light absorbing layer and a second color filter layer sequentially on a substrate and then performing a patterning process. Accordingly, the photoresist layer is formed on the planar second color filter layer; thus, the photolithography process is easier to control so that the misalignment is reduced. Further, the photoresist layer is not removed by the conventional lift-off process, so that the process is simple and the cleaning degree is easy to control.

Moreover, according to the method of fabricating a color filter of this invention, each of the color filter patterns of different colors is substantially rectangular in a vertical cross section, so that poor optical performance conventionally caused by non-uniform thickness is avoided and therefore the reflection area is increased. Also, almost no gap exists between color filter patterns of different colors (pixels) so that the aperture ratio is increased. Moreover, the planarization layer is easy to fill in so that a smoother topography is achieved with the planarization process. Hence, the alignment problem of the liquid crystal molecules caused by the rough topography of the conventional color filter can be solved.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A color filter, comprising:
   a first color filter layer over a substrate;
   a first light absorbing layer between the substrate and the first color filter layer, wherein the first light absorbing layer entirely covers the substrate;
   a second color filter pattern, covering a portion of the first color filter layer; and
   a second light absorbing pattern between the second color filter pattern and the first color filter layer, wherein the second color filter pattern reflects a portion of a wavelength range of a light beam and the second light absorbing pattern absorbs the other portion of the wavelength range of the light beam.

2. The color filter of claim 1, further comprising a planarization layer covering a portion of the first color filter layer not covered by the second color filter pattern.

3. The color filter of claim 2, wherein the planarization layer comprises a material selected from the group consisting of tetraethyl orthosilicate (TEOS), silicon oxide, undoped silicate glass (USG), borophosphosilicate glass (BPSG), phosphosilicate glass (PSG), low dielectric constant materials and combinations thereof.

4. A color filter, comprising:
a first color filter layer over a substrate;
a first light absorbing layer between the substrate and the first color filter layer;
a second color filter pattern, covering a portion of the first color filter layer; and
a second light absorbing pattern between the second color filter pattern and the first color filter layer;
a planarization layer covering a portion of the first color filter layer not covered by the second color filter pattern; and
a third color filter pattern covering a portion of the second color filter pattern, a portion of the planarization layer or both; and
a third light absorbing pattern below the third color filter pattern.

5. The color filter of claim 4, wherein each of the first light absorbing layer, the second light absorbing pattern and the third light absorbing pattern independently comprises titanium (Ti), titanium nitride (TiN), tantalum (Ta), tantalum nitride (TaN), chromium (Cr), molybdenum (Mo) or molybdenum nitride (MoN).

6. The color filter of claim 4, wherein the first color filter layer, the second color filter pattern and the third color filter pattern are inorganic films.

7. A method of fabricating a color filter, comprising:
forming a first light absorbing layer over a substrate, wherein the first light absorbing layer entirely covers the substrate;
forming a first color filter layer on the first light absorbing layer;
forming a second light absorbing layer on the first color filter layer;
forming a second color filter layer on the second light absorbing layer; and
patterning the second color filter layer and the second light absorbing layer so as to form a second color filter pattern and a second light absorbing pattern, wherein the second color filter pattern reflects a portion of a wavelength range of a light beam and the second light absorbing pattern absorbs the other portion of the wavelength range of the light beam.

8. The method of claim 7, further comprising forming a first planarization layer covering a portion of the first color filter layer not covered by the second color filter pattern.

9. The method of claim 8, further comprising performing a planarization process to the first planarization layer.

10. A method of fabricating a color filter, comprising:
forming a first light absorbing layer over a substrate;
forming a first color filter layer on the first light absorbing layer;
forming a second light absorbing layer on the first color filter layer;
forming a second color filter layer on the second light absorbing layer;
patterning the second color filter layer and the second light absorbing layer so as to form a second color filter pattern and a second light absorbing pattern;
forming a first planarization layer covering a portion of the first color filter layer not covered by the second color filter pattern;
performing a planarization process to the first planarization layer; and
forming a third light absorbing layer and a third color filter layer on the substrate; and
patterning the third color filter layer and the third light absorbing layer so as to form a third color filter pattern and a third light absorbing pattern, which cover a portion of the second color filter pattern, a portion of the planarization layer or both.

11. The method of claim 10, further comprising forming a second planarization layer covering a portion of the first planarization layer and a portion of the second color filter layer that are not covered by the third color filter pattern.

12. The method of claim 10, wherein each of the first light absorbing layer, the second light absorbing pattern and the third light absorbing pattern independently comprises titanium (Ti), titanium nitride (TiN), tantalum (Ta), tantalum nitride (TaN), chromium (Cr), molybdenum (Mo) or molybdenum nitride (MoN).

13. The method of claim 10, wherein the first color filter layer, the second color filter pattern and the third color filter pattern are inorganic films.

14. A reflective liquid crystal display panel, comprising:
a transparent substrate, having a first electrode layer thereon;
a reflection substrate, having thereon
a device layer; and
a color filter, comprising:
a first color filter layer over the reflection substrate;
a first light absorbing layer between the first color filter layer and the reflection substrate;
a second color filter pattern, covering a portion of the first color filter layer; and
a second light absorbing pattern between the second color filter pattern and the first color filter layer; and
a liquid crystal layer, disposed between the first electrode layer and the color filter.

15. The reflective projection display panel of claim 14, wherein the reflection substrate comprises a semiconductor substrate or another transparent substrate having a reflection layer thereon.

16. The reflective liquid crystal display panel of claim 14, further comprising a polarization film on a surface of the transparent substrate not having the first electrode layer thereon.

17. The reflective liquid crystal display panel of claim 14, further comprising a planarization layer covering a portion of the first color filter layer not covered by the second color filter pattern.

18. The reflective liquid crystal display panel of claim 17, wherein the planarization layer comprises a material selected from the group consisting of tetraethyl orthosilicate (TEOS), silicon oxide, undoped silicate glass (USG), borophosphosilicate glass (BPSG), phosphosilicate glass (PSG), low dielectric constant materials and combinations thereof.

19. The reflective liquid crystal display panel of claim 17, wherein the color filter further comprises a third color filter pattern and a third light absorbing pattern therebelow, which cover a portion of the second color filter pattern, a portion of the planarization layer or both.

20. The reflective liquid crystal display panel of claim 19, wherein each of the first light absorbing layer, the second light absorbing pattern and the third light absorbing pattern independently comprises titanium (Ti), titanium nitride (TiN), tantalum (Ta), tantalum nitride (TaN), chromium (Cr), molybdenum (Mo) or molybdenum nitride (MoN).

* * * * *